UNITED STATES PATENT OFFICE.

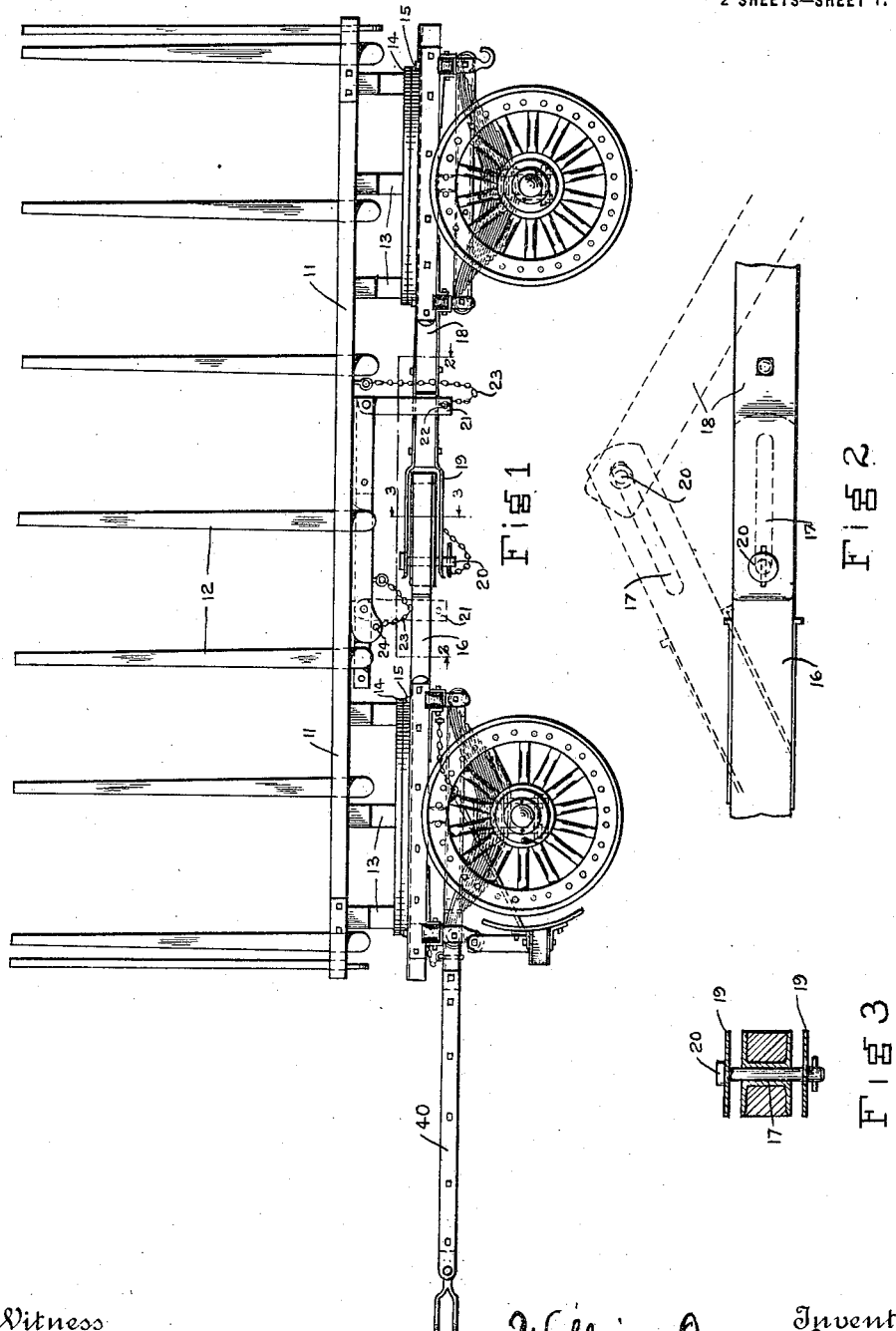

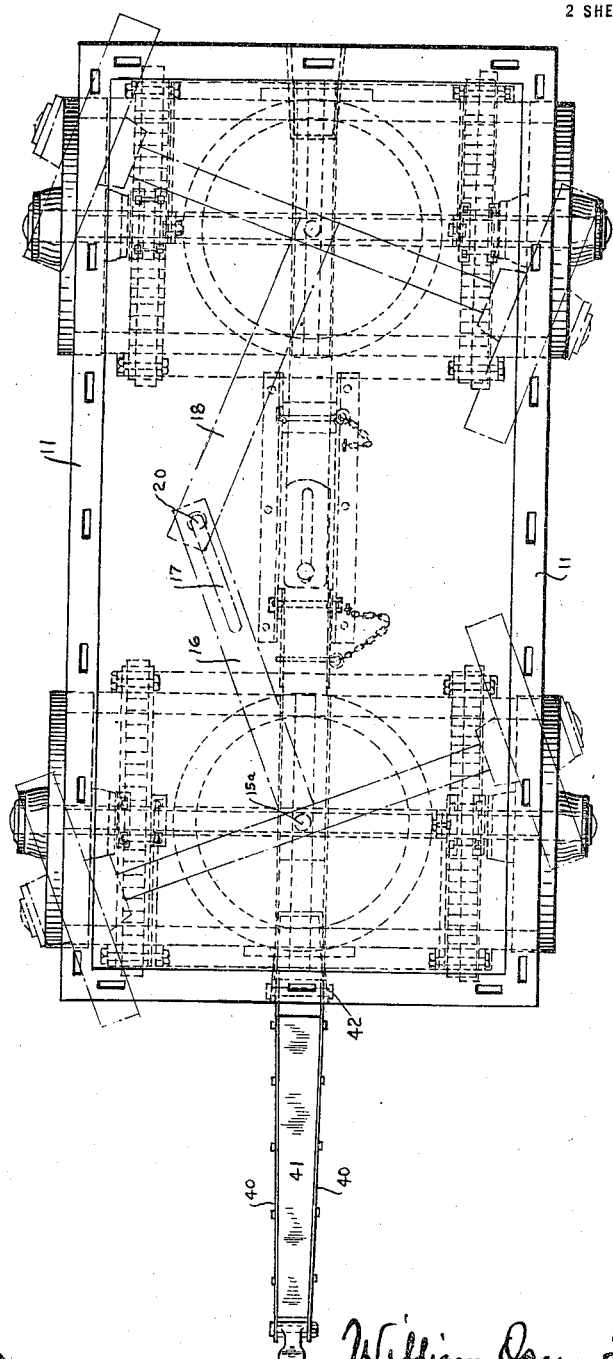

WILLIAM OSCAR SHADBOLT, OF NEW YORK, N. Y.

TRUCK.

1,179,662.  Specification of Letters Patent.  Patented Apr. 18, 1916.

Application filed May 8, 1915. Serial No. 26,799.

*To all whom it may concern:*

Be it known that I, WILLIAM OSCAR SHADBOLT, a citizen of the United States, and a resident of the borough of Brooklyn, in the city and State of New York, have invented certain new and useful Improvements in Trucks, of which the following is a specification.

My invention relates to trucks, and has for one of its objects to provide a truck in which the rear axle may be automatically swung in rounding a curve.

The invention consists in the novel construction, arrangement and combination of various devices, elements and parts, as shown in the accompanying drawings and hereinafter more particularly described.

In the said drawings, Figure 1 is a side elevation of a truck constructed according to my invention; Fig. 2 is a detail plan view of a small portion of same, as will be hereinafter explained, being taken on the line 2—2 of Fig. 1; Fig. 3 is a transverse vertical section taken on the line 3—3 of Fig. 1, looking in the direction of the arrows; and Fig. 4 is a plan view showing more particularly the axle swinging mechanism.

In carrying my invention into effect in the embodiment thereof, which I have selected for illustration in the accompanying drawings and description in this specification, I provide a truck carrying body of the usual or any suitable type, comprising a floor having a marginal rectangular frame 11, which may if desired be provided with the usual removable standards 12. Underneath this body may be provided transverse supporting beams of the usual well understood construction, as 13, which are supported on the upper members of fifth wheels of the ordinary or any suitable type. In connection with the said truck body above described I provide running gear, comprising a front and rear axle, wheels thereon, a fifth wheel for each axle, and springs interposed between said axles and the corresponding fifth wheels. In the drawings the upper members of said fifth wheels are designated by the number 14, and the lower members by 15, and it will of course be understood that these upper and lower members are pivotally connected together in the usual or any suitable manner, as by king-bolts 15ᵃ.

My invention comprises means by which the front and rear axles, which as above explained are each pivotally secured to the truck body and capable of swinging or swiveling with reference thereto, are operatively connected so that they may turn or swing together but in opposite directions, so as to facilitate the operation of the truck in passing around a curve, said connecting means being so constructed as to permit the same to be thrown out of operative connection and to permit either or both of the axles to be locked in a position at right angles to the length of the truck body, and this mechanism is now to be described.

Operatively connected with the lower member 15 of the fifth wheel of the forward axle, is a rearwardly extending tongue or reach 16 provided near its rear end with a slot 17. Similarly connected to the lower member of the rear fifth wheel, and forwardly extending therefrom, is a corresponding tongue or reach 18, which is provided at its forward end with a forked member 19, provided with a bolt 20, which is adapted to pass through the slot 17 as shown in the drawings, more particularly in Fig. 2, the bolt and bracket being shown in detail in Fig. 3. It will be obvious that from this construction, when the forward axle is turned or swung in one direction, the rear axle will be swung in the opposite direction, and that this corresponding and coacting swinging of the two axles will occur whenever the said two tongues or reaches are connected together by the bolt 20 but are otherwise free to swing.

It will sometimes be desired to secure both the front and rear axles against swinging, or to secure one of said axles, leaving the other free to swing. To accomplish this I provide forked brackets or securing members 21, pivotally secured to the under part of the truck body and adapted to hang vertically or to be swung up into a horizontal position. In the drawings (see Fig. 1) the rear securing member 21 is shown in full lines in its dependent or vertical operative position, securing the reach 18 against lateral motion, and in dotted lines in its raised inoperative position; and the forward member 21 is shown in its inoperative position and there secured by a pin 24 inserted beneath the same, the operative position being shown in dotted lines. Each of said members 21 is provided with a perforation near its outer end, and when said members are in their lowered or operative position it is desirable to insert a pin in such perforation, below the reach, as indicated at 22 in Fig. 1, in order to prevent the member 21 from swinging out of engagement with the reach. The said pins may be held by chains 23 in order to prevent their loss when not in use.

A tongue or link for attaching the truck to a tractor or the like, is removably secured to the front end of the truck. It will of course be understood that a longer tongue of suitable construction may be employed if the truck is to be drawn by horses. The tongue shown in the drawings comprises a pair of side plates 40 with an intermediate member 41.

The operation of my invention is as follows: When it is desired to use the truck in the ordinary manner, the tongues or reaches 16 and 18 are disconnected from each other, the rear securing bracket 21 dropped so as to prevent the reach 18 from swinging, and the forward securing bracket 21 raised up out of operative position so as to allow the reach 16 and the forward axle to swing freely. When it is desired to adapt the truck for turning sharp corners, the reaches are connected together as shown in Fig. 1, and both of the brackets are raised out of operation.

In using a tractor-drawn vehicle, it is often desired to back the same into a yard or other inclosure, and where space is limited or accuracy in placing the truck is required, it is often very difficult to accomplish such purpose. In a truck constructed according to my invention however it is comparatively easy to maneuver the same into any desired position, by securing the forward reach 16, disconnecting the rear reach 18 from the forward reach and from its bracket, and inserting a tongue or tiller into the socket 30° of the rear wheels. Upon then backing the tractor, the truck may be accurately and easily guided into any desired position.

The advantages of my invention will be obvious from what has been above said regarding its construction and method of operation.

Having thus described my invention, what I claim as new and desire to secure by Letters Patent is as follows:

1. In a vehicle, the combination with a carrying body, of a front and rear axle pivotally secured to said body, devices adapted to operatively connect said axles so that when one axle is swung in one direction the other axle shall swing in the opposite direction, said swinging devices comprising a rearwardly extending reach rigidly secured to said front axle, a forwardly extending reach on said rear axle, and means adapted to pivotally and slidably connect the free ends of said reaches together; and means adapted when in one position to hold one of said reaches against lateral motion and when in another position to permit said reach to move.

2. In a vehicle, the combination with a carrying body, of a front and rear axle pivotally secured to said body, devices adapted to operatively connect said axles so that when one axle is swung in one direction the other axle shall swing in the opposite direction, said swinging devices comprising a rearwardly extending reach rigidly secured to said front axle, a forwardly extending reach on said rear axle, a perforation in one of said reaches, a slot in the other of said reaches, and a pin passing through said perforation and said slot; and means adapted when in one position to hold one of said reaches against lateral motion and when in another position to permit said reach to move.

3. In a vehicle, the combination with a carrying body, of a front and rear axle pivotally secured to said body, devices adapted to operatively connect said axles so that when one axle is swung in one direction the other axle shall swing in the opposite direction, said swinging devices comprising a rearwardly extending reach on said front axle, a forwardly extending reach on said rear axle, and means adapted to pivotally and slidably connect said reaches together; and means adapted when in one position to hold one of said reaches against lateral motion and when in another position to permit said reach to move, said means comprising a forked member swingingly secured to said body and adapted when in one position to straddle said reach and hold the same, and when in another position to clear said reach.

4. In a vehicle, the combination with a carrying body, of a front and rear axle pivotally secured to said body, devices adapted to operatively connect said axles so that when one axle is swung in one direction the other axle shall swing in the opposite direction, said swinging devices comprising a rearwardly extending reach on said front axle, a forwardly extending reach on said rear axle, and means adapted to pivotally and slidably connect said reaches together; means adapted when in one position to hold one of said reaches against lateral movement and when in another position to permit said reach to move, said means comprising a forked member swingingly secured to said body and adapted when in one position to straddle said reach and hold the same and when in another position to clear said reach; and means adapted to hold said forked member in either position.

5. The combination with a vehicle comprising a carrying body, a pair of axles pivotally secured thereto, and a reach on each of said axles; of a pair of forked members independently swingingly suspended from said carrying body above said reaches, each of said forked members being adapted when in a lowered position to straddle the reach below and hold the same, and when in a raised position to clear said reach.

6. The combination with a vehicle comprising a carrying body, a pair of axles pivotally secured thereto, and a reach on each of said axles; of a pair of forked members independently swingingly suspended from said carrying body above said reaches, each of said forked members being adapted when in a lowered position to straddle the reach below and hold the same, and when in a raised position to clear said reach, and means connected with each fork adapted to hold it in either position.

In witness whereof I have hereunto signed my name this 5th day of May 1915.

WILLIAM OSCAR SHADBOLT.

Copies of this patent may be obtained for five cents each, by addressing the "Commissioner of Patents, Washington, D. C."